United States Patent
Shein et al.

(10) Patent No.: US 9,443,017 B2
(45) Date of Patent: Sep. 13, 2016

(54) SYSTEM AND METHOD FOR DISPLAYING SEARCH RESULTS

(71) Applicant: Yandex Europe AG, Lucerne (CH)

(72) Inventors: Anton Borisovich Shein, Moscow (RU); Taras Anatolievich Sharov, Obninsk (RU)

(73) Assignee: Yandex Europe AG, Lucerne (CH)

( * ) Notice: Subject to any disclaimer, the term of this patent is extended or adjusted under 35 U.S.C. 154(b) by 8 days.

(21) Appl. No.: 14/293,573

(22) Filed: Jun. 2, 2014

(65) Prior Publication Data

US 2015/0227623 A1  Aug. 13, 2015

(30) Foreign Application Priority Data

Feb. 13, 2014 (RU) .................. 2014105312

(51) Int. Cl.
*G06F 17/30* (2006.01)
(52) U.S. Cl.
CPC .................. *G06F 17/30864* (2013.01)
(58) Field of Classification Search
CPC ................................. G06F 17/30389
See application file for complete search history.

(56) References Cited

U.S. PATENT DOCUMENTS

| 7,054,870 B2 | 5/2006 | Holbrook | |
|---|---|---|---|
| 8,375,325 B2 | 2/2013 | Wuttke | |
| 8,572,111 B2 | 10/2013 | McDonald | |
| 2005/0192944 A1* | 9/2005 | Flinchem | 707/3 |
| 2007/0067305 A1* | 3/2007 | Ives | G06F 17/30864 |
| 2007/0132727 A1* | 6/2007 | Garbow et al. | 345/157 |
| 2009/0240672 A1* | 9/2009 | Costello | 707/4 |
| 2012/0078896 A1* | 3/2012 | Nixon et al. | 707/732 |
| 2013/0110803 A1 | 5/2013 | Mikalsen et al. | |

FOREIGN PATENT DOCUMENTS

| RU | 2431187 C2 | 10/2009 | |
|---|---|---|---|
| WO | 0002143 A1 * | 1/2000 | G06F 17/30 |

OTHER PUBLICATIONS

Computer Sciences Corporation, User's Manual for the Examiners Automated Search Tool (EAST) 2.1, May 5, 2006, pp. 6-49, 6-57, and 6-88.*
StackOverflow, http://web.archive.org/web/20100306014552/http://stackoverflow.com/questions/914951/show-and-hide-divs-at-a-specific-time-interval-using-jquery.*
http://web.archive.org/web/20130212052523/http://motors.shop.ebay.com/Cars-Trucks-/6001/i.html.*

(Continued)

*Primary Examiner* — Alexey Shmatov
*Assistant Examiner* — Matthew Ellis
(74) *Attorney, Agent, or Firm* — Arent Fox LLP; Michael Fainberg

(57) ABSTRACT

Disclosed are systems, methods and computer program products for showing search information. In one aspect of the invention, a method for showing search information includes processing, by a hardware processor, a search query input of a user; providing, via a user interface component, a preview of a number of search results corresponding to at least a portion of the processed search query input; detecting, by the hardware processor, activation of the user interface component; and displaying at least a portion of the search results in response to the activation of the user interface component.

18 Claims, 4 Drawing Sheets

(56) References Cited

OTHER PUBLICATIONS http://web.archive.org/web/20140331091253/http://docs.aws.amazon.com/cloudsearch/latest/developerguide/getting-suggestions.html.*
Ebay, Jan. 21, 2013, http://web.archive.org/web/20130121110924/http://motors.shop.ebay.com/Cars-Trucks/6001/i.html?rt=nc&LH_BIN=1&_dmpt=US_Cars_Trucks&_trksid=p4506.c0.m301.*
RCSB Protein Data Bank, Top Bar Search, May 25, 2013, http://www.rcsb.org/pdb/staticHelp.do?p=help/topBarSearch.html, pp. 1-4.*

* cited by examiner

Flight Search — 200

From: (city or airport) — 202
To: (city or airport) — 204

Departure Date:
mm/dd/yyyy — 206

Return Date:
mm/dd/yyyy — 208

Passenger(s):
— 210

Search — 212

Fig. 2A

Flight Search

From: (city or airport) — 214
Moscow

To: (city or airport) — 216
New York

Departure Date:
mm/dd/yyyy

Return Date:
mm/dd/yyyy

Passenger(s): — 218
1

9850 Results — 220

Fig. 2B

Flight Search

From: (city or airport)
Moscow

To: (city or airport)
New York

Departure Date:
mm/dd/yyyy

Return Date:
mm/dd/yyyy

Passenger(s):
1

Search — 222

Fig. 2C

SYSTEM AND METHOD FOR DISPLAYING SEARCH RESULTS

CROSS-REFERENCE TO RELATED APPLICATIONS

This application claims benefit of priority under 35 U.S.C. 119(a)-(d) to a Russian Application No, 2014105312 filed on Feb. 13, 2014, which is incorporated by reference herein.

TECHNICAL FIELD

The disclosure relates generally to the field of internet search, and more specifically to the systems, methods and computer program products for providing an optimized graphical user interface to display a number of search results of search engines.

BACKGROUND

Internet searching refers to the practice of using the Internet, which is a global network connecting millions of computers and databases, for assessing and obtaining information from different sources for a variety of purposes. Nowadays, the Internet, especially the World Wide Web, is widely used and readily accessible to hundreds of millions of people in many parts of the world through, e.g., different Internet Service Providers (ISPs). The World Wide Web, or simply Web, is a way of accessing information over the medium of the Internet. The Web is an information-sharing model and uses, e.g., HTTP protocol, to transmit data Web services also use HTTP protocol to allow applications to communicate in order to exchange business logic and use the Web to share information. The Web also utilizes browsers, such as Internet Explorer or Firefox, to access web documents or web pages that are linked to one another via hyperlinks. Web documents may also contain graphics, sounds, text and video.

Typically, when conducting an Internet or web search, a user may compose and enter a search query into, e.g., an input field of a browser and search engine(s) and click a "Search" button. Search engines may in turn retrieve a set of search results that corresponds to the user search query. Generally, search engines match the terms or keywords in the search query to a set of pre-stored web pages and provide hyperlinks as relevant search results to the user. For example, web pages that contain the user's search terms or keywords may be considered to be "hits" and may be returned to the user in an ordered list of hyperlinks based on their relevance to the search query. In assessing the number of the returned search results and the content of each relevant search result, the user may need to revise the original search query or formulate a new search query in the input field of the browser and search engines and click a "Search" button to initiate a new search request even in situations where the user may merely intend to get a preview of the number of the search results of a search term or keyword, or an entered search query returns no results. There is a need for providing an optimized graphical user interface to display a number of search results of search engines so as to assist a user in formulating a search query efficiently.

SUMMARY

Disclosed are systems, methods and computer program products for showing search information. In one example aspect of the invention, a system, method and computer program product may include processing, by a hardware processor, a search query input of a user; providing, via a user interface component, a preview of a number of search results corresponding to at least a portion of the processed search query input; detecting, by the hardware processor, activation of the user interface component; and displaying at least a portion of the search results in response to the activation of the user interface component.

In one example aspect, processing the search query input may include sequentially receiving one or more elements of the search query input and dynamically determining and updating the number of search results based on a received portion of the search query input.

In another example aspect, providing a preview of a number of search results may include displaying the number of search results corresponding to at least the portion of the processed search query input without showing the search results.

In another example aspect, providing a preview of a number of search results may include changing an original visual appearance of the user interface component to display the number of search results corresponding to at least a portion of the search query input.

In another example aspect, while waiting for the activation of the user interface component by the user or modification of search query input by the user, periodically alternating the appearance of user interface component between the original visual appearance and displaying the preview of the number of the search results.

Yet in another example aspect of the invention, a system for showing search information may include a processor operable to execute a search engine that processes a user search query, wherein the search engine includes a user interface component having a dual functionality, wherein a first function of the user interface component includes providing a preview of a number of search results corresponding to at least a portion of the user search query, and wherein a second function of the user interface component includes receiving a user input that causes the processor to display at least a portion of the search results.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

FIGS. 2A-2C are screen shots illustrating an example method for showing search information according one aspect of the invention.

DETAILED DESCRIPTION

Example aspects of the present invention are described herein in the context of systems, methods and computer program products for providing an optimized graphical user interface to display a number of search results of search engines. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

Figure 1:
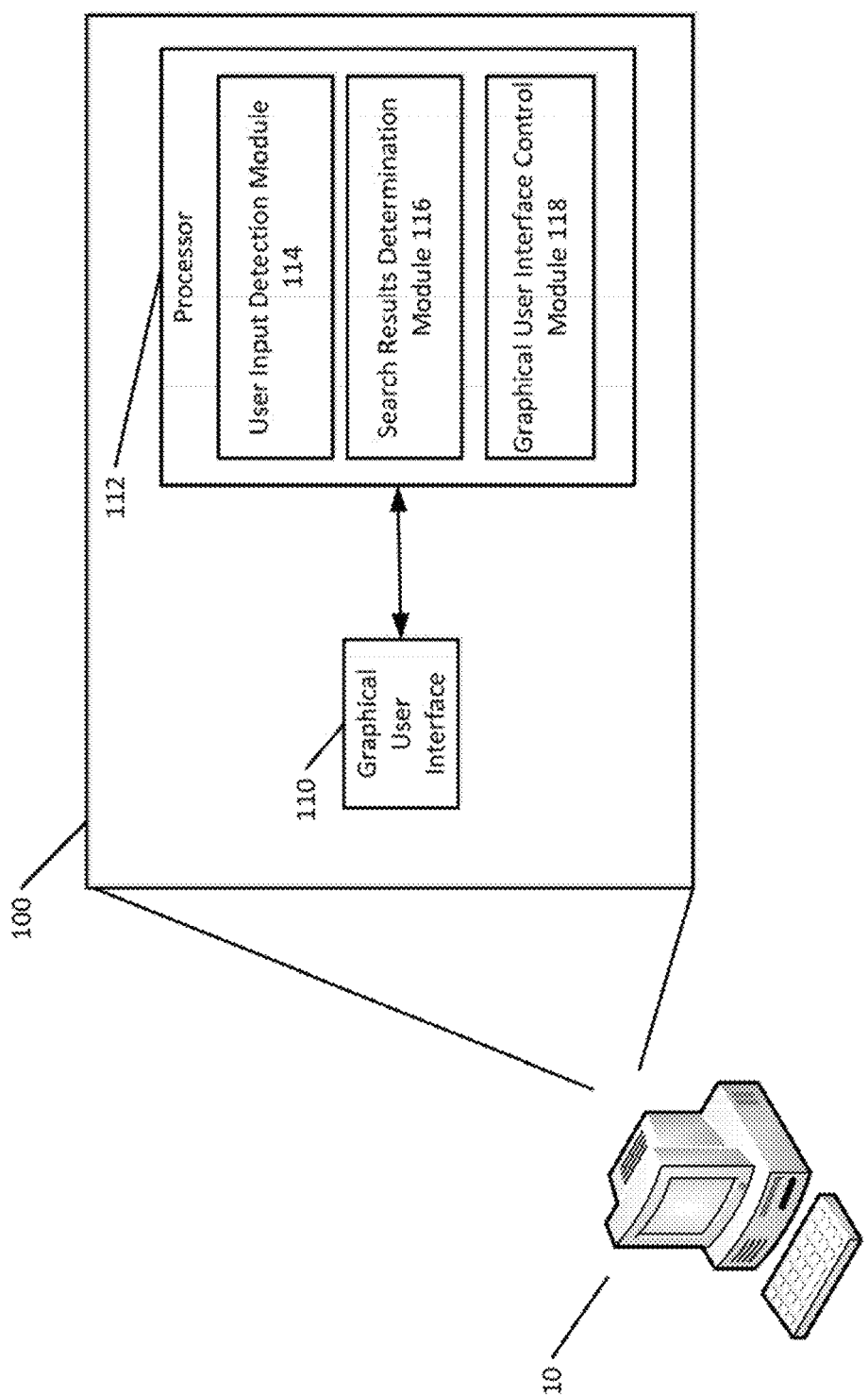
FIG. 1 is a diagram illustrating an example configuration of a system for showing search information according to one aspect of the invention.

According to one aspect, FIG. 1 depicts one example configuration of system 100 for showing a number of search results that corresponds to a user search query. In one aspect, system 100 may be implemented as a software application, a desktop widget, an applet, a script or other type of software program code executable on a computer device 10, such as a PC, tablet, notebook, smart phone or other type of computing devices. As shown, the system 100 may have a plurality of software and hardware modules, including but not limited to a graphical user interface 110 and a processor 112 comprising a user input detecting module 114, search results determination module 116, and graphical user interface controller module 118.

The term "module" as used herein means a real-world device, apparatus, or arrangement of modules implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 4 below). Accordingly, each module can be realized in a variety of suitable configurations, and should not be limited to any particular implementation exemplified herein.

According to an aspect of the invention, a user may formulate and enter a search query via an input field (not shown) of the graphical user interface 110 implemented on the computer device 10. The search query may be, for example, a document search request represented as a keyword, or a keyword set including one or more search terms or keywords. Generally, the search request may be of any data structure (e.g., keyword, keyword set, Internet address, Structured Query Language) corresponding to one or more searchable information resources accessible on the computer device 10, databases external to the system 100, or the Internet. The graphical user interface 110 may include a command button or push button (not shown) in connection with the input field such that a user may click the button to initiate a search request with respect to the submitted search query to processor 112 through one or more search engines. More specifically, the processor 112 may use a user input detection module 114 to receive the search query formulated and entered by the user in the input field of the graphical user interface 110 upon detecting that the user clicks the command button. The activation of the button not only initiates a search request but also serves to indicate that the search query has been finalized and submitted. It should be appreciated by those skilled in the art that the button may be implemented as, but not limited to, a dedicated command button or push button, which is a user interface component or element that is integrated with the graphical user interface 110 to provide the user with a simple way to trigger an event including carrying out a query at a search engine in response to receiving a user search query in the input field, or to interact with other graphical user interface components (e.g., dialog boxes) for confirming a user action. Alternatively, the button may be implemented as a toolbar button of a web browser toolbar, a menu item within a menu of a web browser, a selectable object (e.g., link or selectable icon) embedded within a document currently being displayed within a web browser window, or a function included within a frame in a web browser window. Additionally, other mechanisms which may or may not be integrated within a browser for providing the button functionality described herein may also be used according to aspects of the present invention.

A search request may be initiated by a search results determination module 116 of the processor 112 for processing the submitted search query through one or more search engines. A search engine may refer to a computer program that helps a user to locate information that contain or are associated with subject matter that matches search query terms. Search engines may be applied in a variety of contexts pertaining to any searchable data in any format. For example, the searchable data may include a user's address book, saved links, personally stored images (such as .jpeg files, .gif files, etc.), video, audio (.mp3 files, .wmv files, etc.), contact information (e.g., v-cards), calendar objects, word processing documents, graphics files, or computer code (object files and source code). Search engines may be useful for locating information that are accessible through the Internet including, for example, web pages containing graphics, sounds, text and video. In an aspect, the search engine may rank the search results prior to presenting the search results to the user in a list of items with titles, a reference to the full version, and a short description showing where the search terms have matched the content within a Web page. The item with the highest ranking may be considered to be the most relevant to the search query specified by the user. For example, the search results determination module 116 may determine and retrieve a number of the returned search results and/or the content of each relevant search result. Thereafter, a graphical user interface control module 118 of the processor 112 may be configured to present such information to the user in the graphical user interface 110. Presenting search results by the graphical user interface control module 118 may alternatively include, for example, displaying search results on a different display device than the computer device 10, transmitting search results to another device external to the system 100, transmitting visual or acoustic signals corresponding to the search results, providing haptic feedback corresponding to the search results, or transmitting signals comprising haptic feedback corresponding to the search results to a user's designated device for presentation to the user.

Often, the search process is an iterative task in which the user forms a search query, determines whether the voluminous search results are adequate, and then re-formulates the search query, if needed. Therefore, the user experience with search engines may be frustrating and time consuming, as the user may need to spend considerable time and effort assessing the returned search results to determine whether a submitted search query has yielded adequate search results. For example, even in situations where the user may merely intend to get a preview of the number of the search results of a search term or keyword, or an entered search query returns no meaningful results, the user may still be required to revise the original search query or form a new search query in the input field of the graphical user interface 110 and submit an updated search query to the processor 112 by clicking a "Search" button or entering a carriage return in order to initiate a new search request.

Accordingly to aspects of the invention, a search request may be initiated by the processor 112 in situations where the search query has not been finalized or submitted. For example, a user may merely intend to get a preview of the number of the search results of certain search term or a combination of certain search terms entered in the input field of the graphical user interface 110 without clicking the button to submit a completed search query. In example aspect, upon detecting that a user search query is formulated in the input field of the graphical user interface 110 by the user input detection module 114, the processor 112 may use the search results determination module 116 to start processing the received search query through one or more search engines. Contemporaneously, the processor 112 may use the graphical user interface control module 118 to provide a preview of a number of search results corresponding to at least a portion of the processed search query input by changing a visual appearance of the command button or push button associated with the input field to display the number of search results based on at least the portion of the processed search query input.

Referring to FIGS. 2A-2C, accordingly to aspects of the invention, the system 100 of FIG. 1 may implement an example e-commerce application 200 to provide a graphical representation of option identification and associated available ranges for a set of available items, and allow a user to perform a real-time tradeoff analysis and adjustment of one or more of search criteria based on a preview of the number of search results without explicitly clicking a "Search" button to submit a completed search query.

Referring to FIG. 2A, the user may input search criteria into a user interface (e.g., the graphical user interface 110 in FIG. 1) provided by an example flight reservation system 200 to specify a departure city 202, a destination city 204, departure date 206, return date 208, a number of passengers 210. A dual functioned "Search" button 212 may be configured to change its visual appearance when switching between a search function and a preview function to display a number of search results in response to at least a portion of processed user search query input received from 202-212. Referring to FIG. 2B, upon detecting that the user has sequentially specified and entered details of a planned trip including the departure city 214, destination city 216, and the number of passengers 218 via, for example, the user input detection module 114 of FIG. 1, the processor 112 may use the search results determination module 116 to dynamically determine and update a number of search results based on the received information. In the meantime, the processor 112 may use the graphical user interface control module 118 to change the original visual appearance of the dual functioned "Search" button 212 of the graphical user interface 110 to provide a preview of the number of search results corresponding to at least a portion of the processed search query input without showing contents of each of the search results. Therefore, according to an advantageous aspect of the present invention, when the user may merely intend to get a preview of the number of the search results of one or more search terms or keywords, or an entered search query returns no results, the user may avoid submitting a new search query in the graphical user interface 110 to the processor 112 by clicking the "Search" button 212 in order to initiate a new search request. The present invention allows the user to obtain a preview of the number of the search results of a not-yet-submitted or finalized search query such that the user may weigh, balance, or adjust different search query options in real-time accordingly without reviewing detailed descriptions of the search result items. More importantly, according to aspects of the present invention, when web pages are displayed on a portable mobile device having overall limited display screen real estate (space), the user may avoid going back and forth between different search queries by repeatedly clicking the "Search" button 212 when a preview of the number of the search results of an attempted search query is intended, and more screen space may be available for conveying useful information. It should be appreciated that changing the visual appearance of the dual functioned "Search" button 212 may include, but not limited to, color change or a shape change of the button 212, or changing the button to provide an animation, a sound, a vibration or other visual, audible or tactile feedback in relation to the preview of the number of the search results. According to an aspect of the invention, the button may have a changeable size depending on an amount of data shown in the button. For example, the size of button 212 may be dynamically adjusted depending on a quantity of returned search results corresponding to a processed user search query, or depending on a size of a device and application screen on which the graphical user interface 110 and the button 212 are implemented and rendered, or a combination thereof.

Further, referring to FIG. 2C, the processor 112 in FIG. 1 may use the graphical user interface control module 118 to switch the dual functioned "Search" button 212 of the graphical user interface 110 back to its original visual appearance 222 after displaying the preview of the number of the search results 220 in FIG. 2B. In further aspect, the user may click on the button 212 to finally submit a search query and obtain the number of search results and/or contents of each of return search results. In yet another aspect, while waiting for user to click the button 212 or modify his/her input search query, the appearance of "Search" button 212 may be periodically (e.g. every couple of seconds) changed between its original visual appearance 222 and displaying the preview of the number of the search results 220.

Figure 3:
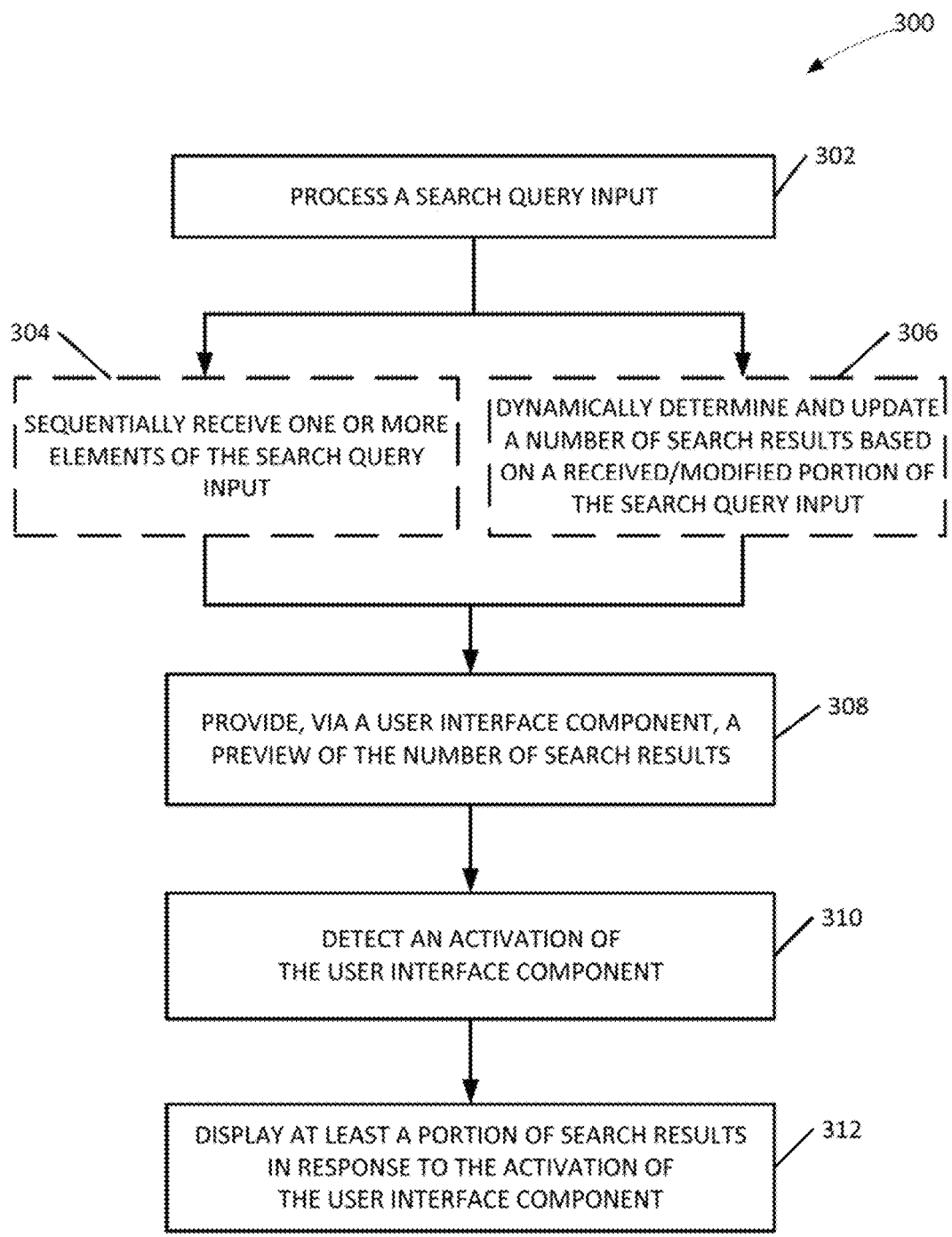
FIG. 3 is a flow diagram illustrating an example method for showing search information according one aspect of the invention.

According to an aspect of the invention, FIG. 3 depicts an example method for showing a number of search results that corresponds to a user search query. The method 300 may be implemented by the system 100 of FIG. 1. At step 302, the method 300 may include processing, via, for example, the processor 112 of FIG. 1, a search query input received on the graphical user interface 110 of the computer device 10. At steps 304 and 306, processing the search query input of the method 300 may respectively include sequentially receiving one or more elements of the search query input and dynamically determining and updating the number of search results based on a received or modified portion of the search query input. At step 308, the method 300 may include simultaneously providing a preview of a number of search results corresponding to at least a portion of the processed search query input by changing a visual appearance of a user interface component to display the number of search results based on at least the portion of the processed search query input. The user interface component may be a command button or push button associated with an input field of the graphical user interface 110. Further, the preview may display the number of search results corresponding to at least the portion of the processed search query input without showing contents of each of search results in order to save screen space of the computer device 10. At step 310, the method 300 may include detecting an activation of the user interface component by the user. At step 312, the method 300 may include displaying at least a portion of search results in response to the activation of the user interface component.

Figure 4:
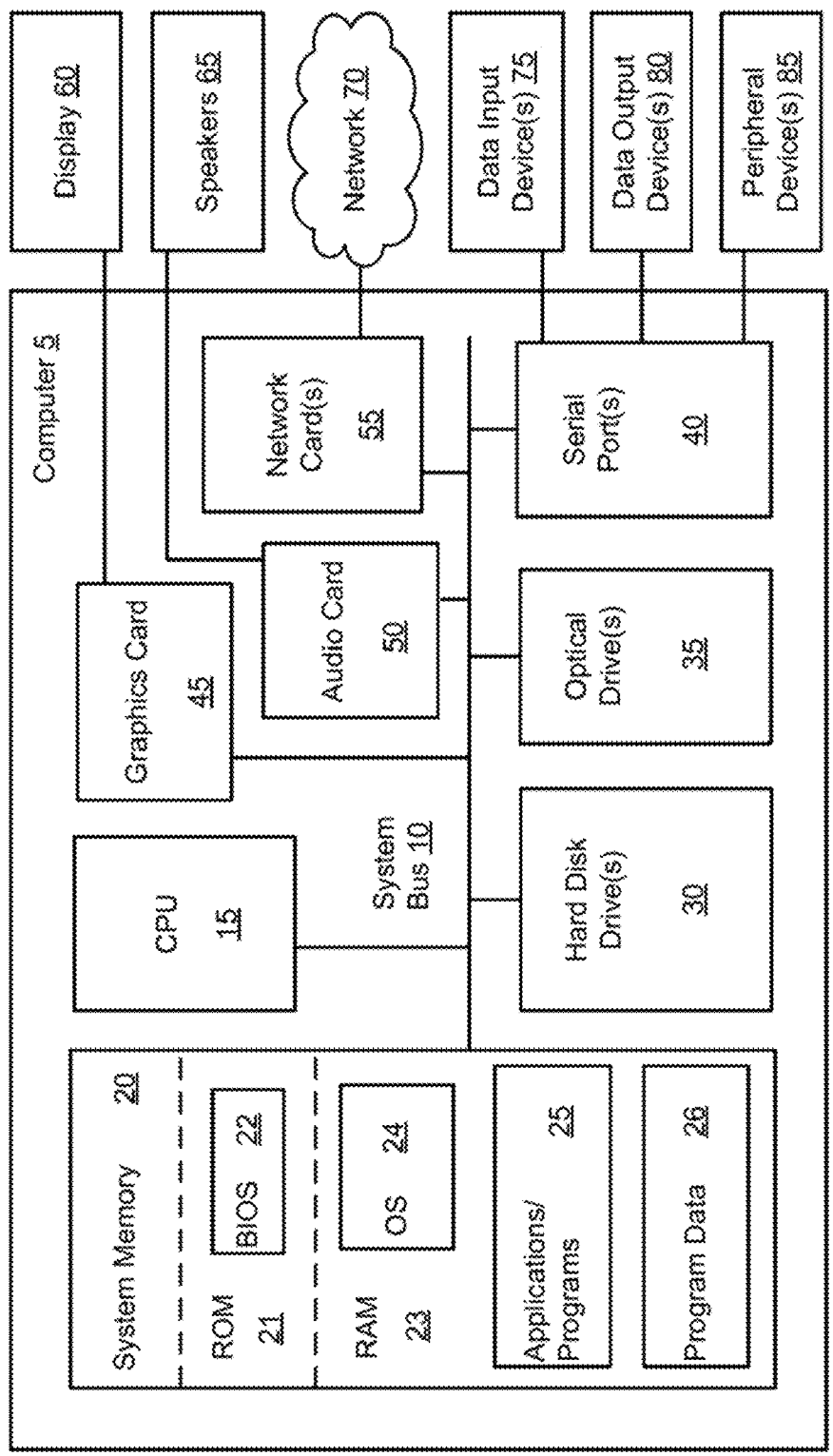
FIG. 4 is a diagram illustrating an example general-purpose computer system on which the systems and methods for showing search information in accordance with aspects of the invention.

FIG. 4 depicts one example aspect of a computer system 5 that may be used to implement the disclosed devices and methods for showing search information. The computer system 5 may include, but not limited to, a personal computer, a notebook, tablet computer, a smart phone, a mobile device, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel Core 2 Quad 2.33 GHz processors or other type of microprocessor.

System memory 20 may include a read-only memory (ROM) 21 and random acc memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMS, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia GeForce GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for showing search information on a screen, the method comprising:
   providing a user interface comprising:
      a first user interface component for receiving one or more elements of a search query input from a user, and
      a second interface component having a dual functionality, including (i) providing a preview of an integer number of search results corresponding to at least a portion of the search query input without showing contents of the search results, and (ii) receiving a user input that causes display of at least a portion of contents of the search results;

receiving, via the first user interface component, one or more elements of the search query input from the user;

processing, by a processor, the search query having the one or more received inputs prior to the user finalizing and submitting the search query;

dynamically determining and updating, by the processor, an integer number of search results as the first user interface component continues to receive the one or more elements of the search query input from the user;

dynamically providing for display to the user, via the second user interface component, only the integer number of search results corresponding to at least a portion of the processed search query input without showing on the screen any additional information relating to the search results;

detecting, by the processor, activation of the second user interface component by the user; and providing for display to the user at least a portion of the search results in response to the activation of the second user interface component.

2. The method of claim 1, wherein the second user interface component comprises a button.

3. The method of claim 1, wherein the integer number of search results is dynamically provided for display at the same time that the first user interface component continues to receive the one or more elements of the search query input from the user and the processor dynamically determines and updates the integer number of search results.

4. The method of claim 3, wherein, while waiting for the activation of the second user interface component by the user or modification of search query input by the user, periodically alternating the appearance of the second user interface component between the original visual appearance and displaying the integer number of the search results.

5. The method of claim 1, wherein the second user interface component has a changeable size depending on an amount of data shown in the second user interface component, and the amount of data is indicative of a quantity of returned search results corresponding to the at least a portion of the processed search query input.

6. The method of claim 1, wherein the second user interface component has a changeable size depending on a size of a device and the screen on which the second user interface component is implemented.

7. A system for showing search information on a screen, the system comprising:

a processor configured to:

provide a user interface comprising:

a first user interface component for receiving one or more elements of a search query input from a user, and a second interface component having a dual functionality, including (i) providing a preview of an integer number of search results corresponding to at least a portion of the search query input without showing contents of the search results, and (ii) receiving a user input that causes display of at least a portion of contents of the search results;

receive, via the first user interface component, one or more elements of the search query input from the user;

process the search query having the one or more received inputs prior to the user finalizing and submitting the search query;

dynamically determine and update an integer number of search results as the first user interface component continues to receive the one or more elements of the search query input from the user;

dynamically provide for display to the user, via the second user interface component, only the integer number of search results corresponding to at least a portion of the processed search query input without showing on the screen any additional information relating to the search results;

detect activation of the second user interface component by the user; and provide for display to the user at least a portion of the search results in response to the activation of the second user interface component.

8. The system of claim 7, wherein the second user interface component comprises a button.

9. The system of claim 7, wherein the integer number of search results is dynamically provided for display at the same time that the first user interface component continues to receive the one or more elements of the search query input from the user and the processor dynamically determines and updates the integer number of search results.

10. The system of claim 9, wherein the processor is further configured to, while waiting for the activation of the second user interface component by the user or modification of search query input by the user, periodically alternate the appearance of the second user interface component between the original visual appearance and displaying the integer number of the search results.

11. The system of claim 7, wherein the second user interface component has a changeable size depending on an amount of data shown in the second user interface component, and the amount of data is indicative of a quantity of returned search results corresponding to the at least a portion of the processed search query input.

12. The system of claim 7, wherein the second user interface component has a changeable size depending on a size of a device and the screen on which the second user interface component is implemented.

13. A computer program product, stored on a non-transitory computer readable medium, for performing an Internet search and showing search information on a screen, wherein the computer program product includes computer executable instructions for:

providing a user interface comprising:

a first user interface component for receiving one or more elements of a search query input from a user, and a second interface component having a dual functionality, including (i) providing a preview of an integer number of search results corresponding to at least a portion of the search query input without showing contents of the search results, and (ii) receiving a user input that causes display of at least a portion of contents of the search results;

receiving, via the first user interface component, one or more elements of the search query input from the user;

processing the search query having the one or more received inputs prior to the user finalizing and submitting the search query;

dynamically determining and updating an integer number of search results as the first user interface component continues to receive the one or more elements of the search query input from the user;

dynamically providing for display to the user, via the second user interface component, only the integer number of search results corresponding to at least a portion of the processed search query input without showing on the screen any additional information relating to the search results;

detecting activation of the second user interface component by the user; and providing for display to the user at least a portion of the search results in response to the activation of the second user interface component.

14. The computer program product of claim 13, wherein the second user interface component comprises a button.

15. The computer program product of claim 13, wherein the integer number of search results is dynamically provided for display at the same time that the first user interface component continues to receive the one or more elements of the search query input from the user and the integer number of search results is dynamically determined and updated.

16. The computer program product of claim 15, further comprising instructions for, while waiting for the activation of the second user interface component by the user or modification of search query input by the user, periodically alternating the appearance of the second user interface component between the original visual appearance and displaying the integer number of the search results.

17. The computer program product of claim 13, wherein the second user interface component has a changeable size depending on an amount of data shown in the second user interface component, and the amount of data is indicative of a quantity of returned search results corresponding to the at least a portion of the processed search query input.

18. The computer program product of claim 13, wherein the second user interface component has a changeable size depending on a size of a device and the screen on which the second user interface component is implemented.

* * * * *